April 11, 1961 G. KRÜGER ET AL 2,979,417
METHOD OF PREPARING SELF-LUBRICATING WATCH AND
CLOCK PARTS AND THE COATED ARTICLE
Filed June 23, 1958
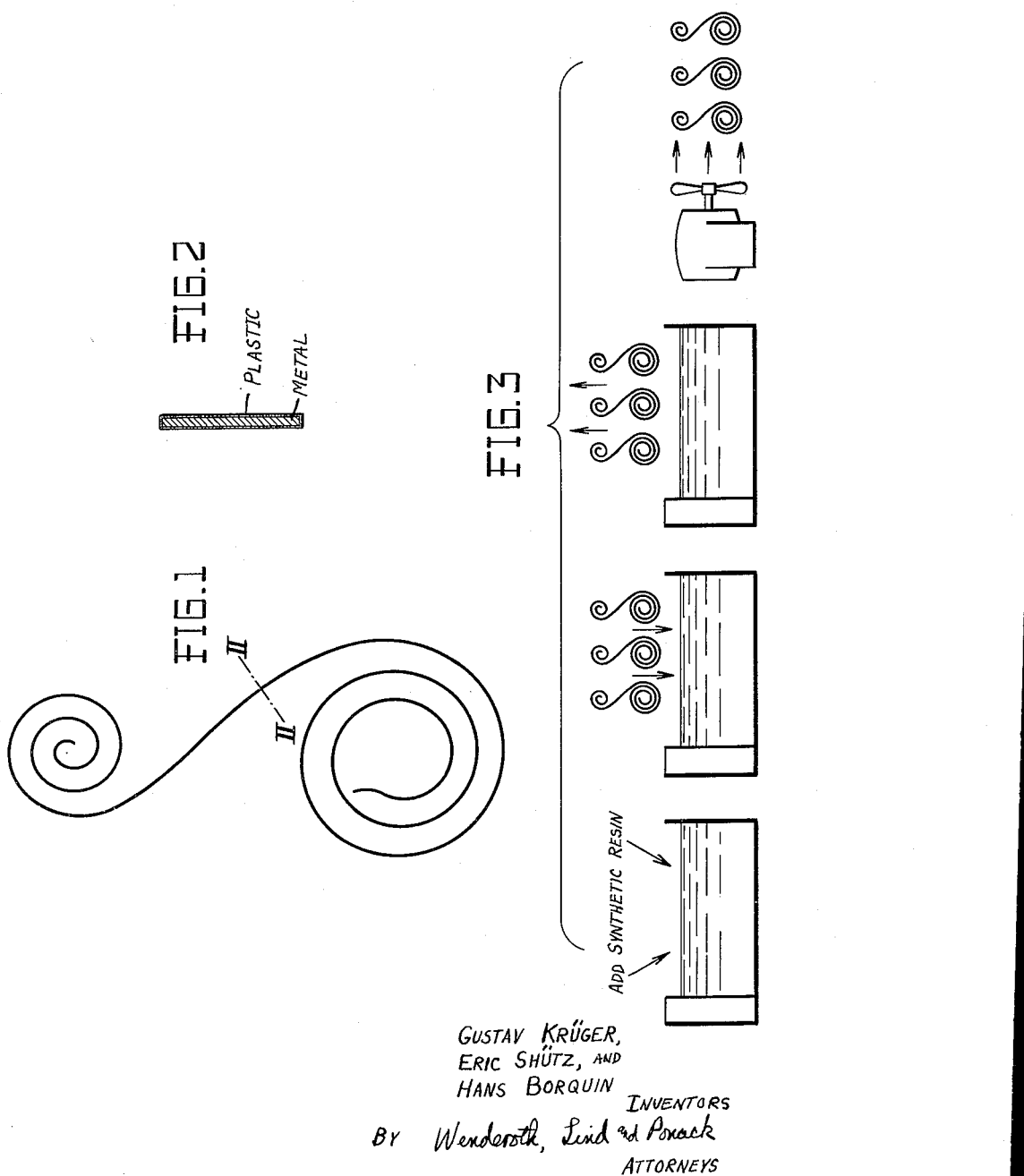
GUSTAV KRÜGER,
ERIC SHÜTZ, AND
HANS BORQUIN
INVENTORS
BY Wenderoth, Lind and Ponack
ATTORNEYS

United States Patent Office 2,979,417
Patented Apr. 11, 1961

2,979,417

METHOD OF PREPARING SELF-LUBRICATING WATCH AND CLOCK PARTS AND THE COATED ARTICLE

Gustav Krüger, Eric Schütz, and Hans Bourquin, all of Waldenburg, Basel-Campagne, Switzerland, assignors to Institut Dr. Ing. Reinhard Straumann A.G., Basel-Campagne, Switzerland, a Swiss company Filed June 23, 1958, Ser. No. 743,959

Claims priority, application Switzerland June 26, 1957

6 Claims. (Cl. 117—65.2)

This invention relates to parts for clock, watch and like mechanisms and their manufacture.

It has been the practice hitherto to grease or oil certain parts of mechanisms such as clock and watch movements, and especially the main springs, before inserting them into their frames or spring barrels for the purpose of reducing friction. This method of lubrication has certain disadvantages inasmuch as the grease or oil ages in course of time, i.e. it resinifies, oxidises, dries, or saponifies, causing the friction of say, the spring inside the barrel to increase and the available torque to diminish. It follows that after a certain period of service the spring must be cleaned and relubricated. It is also not always possible to prevent some of the lubricant escaping from the barrel or casing and becoming contaminated with dust and dirt. Moreover, the film of lubricant on a spring takes up a certain amount of space in the barrel which is thus lost for accommodating the spring and consequently diminishes the capacity of the spring for storing energy.

It is also known that a spring, lubricated in the hitherto conventional manner, tends to unwind in discontinuous jerks because the lubricant becomes sticky, an effect which adversely influences the watch movement.

Another drawback is the influence of high and low temperatures which change the viscosity of the lubricant. Moreover, each individual watch spring must be lubricated by hand, a comparatively costly procedure.

Notwithstanding its many disadvantages the described method of lubrication is still continued because it was thought impossible to use unlubricated parts in watches and clocks on account of the excessively high amount of friction generated therein and the irregularity of their movement.

To overcome all these drawbacks it has been proposed in copending application Ser. No. 663,153 to provide parts of clocks and watches, such as parts of the regulator, the escapement lever, balance wheel, gearwheels, spindle bearings, and so forth, with a coating of a non tacky plastic material selected from the group consisting of thermoplastic as well as thermosetting resins such as polysiloxane resins (silicones); modified phenoplastics, e.g. modified phenol aldehyde resins; poly-ethylene; polyvinyl chloride; aminoplastics, such as melamine resins; furane resins; polyesters; polyamides; polyurethanes; ethoxyline resins; polystyrene; polyvinyl carbazol; polyvinylidene chloride; polychloro-fluorocarbons; polyvinyl acetate; polyvinyl alcohol; polyvinyl formal; polyvinyl acetal; polyvinyl butyral; polyacrylic nitrile; polyacrylic ester; polymethacrylic ester; aldehyde resins; ketonic resins; butadiene polymerisation products; isoprene polymerisation products; chloroprene polymerisation products; organic polysulphides; cellulose esters, cellulose ethers, and similar products (descriptions according to Plastics Handbook, 11th Edition 1955, page 93, Carl Hauser Verlag, Munich), especially polytetrafluoroethylene, or a benzylated phenolic resin. If desired, mixtures of such non tacky plastics may be used.

It has now been found that a coating consisting of one of the above plastics can be replaced by a coating consisting at least partly of a salt of stearic acid, and that in practice this leads to surprisingly good results.

The present invention therefore is broadly a part for a clock, watch or like mechanism wherein the surface to be subjected to sliding contact or friction has a firmly adherent coating or film which is not sticky and which at least partly consists of a salt of stearic acid, the thickness of said coating being not more than 1 micron, and preferably under 0.0005 mm.

The present invention is also a method of producing parts for clock, watch or like mechanisms of the aforementioned kind consisting in providing the surfaces, or the parts thereof which are subject to sliding contact or friction, with a firmly adherent film or coating which is not sticky and consists at least partly of a salt of stearic acid, and which has a thickness of less than 1 micron, preferably less than 0.0005 mm.

The invention will now be described with reference to the accompanying drawing, in which Fig. 1 is a view of a part for a clock, watch or like mechanism;

Fig. 2 is a cross sectional view, on an enlarged scale, of the part of Fig. 1 taken on line II—II of Fig. 1; and Fig. 3 is a representation of the steps of the process by which the part of Fig. 1 is coated according to the method of the present invention.

More generally stated, the present invention relates to the application to clock, watch, and other precision instrument parts of salts of stearic acid in adherent coatings or films that are less than 1 micron and preferably under 0.0005 mm. thick so as to cover at least the rubbing surfaces of these parts for the purpose of providing permanent coatings or films which impart self-lubricating properties to such parts.

References hereinafter to clocks and watches shall be deemed to include instruments and mechanisms of a like kind, as well as parts thereof such as springs, especially main springs for watches, lever escapements and parts thereof, pallets, escapement wheels, toothed wheels, pinions, axles, staffs, bearings, parts of the mechanism of calendar watches and the like.

Parts of clocks and watches which have been provided with a thin film or coating of this kind, which firmly adheres to the surface at least where the latter is subjected to friction, do not require lubrication by an oil or a grease so that they can be assembled in the watch casing without having been previously greased or oiled, and yet will not exhibit the disadvantages of normal unlubricated parts consisting of the same material, or of lubricated parts when the lubricant ages.

The entire coating on said parts of clocks and watches may consist exclusively of a single salt of stearic acid or of a mixture of such salts. Alternatively, it may consist only partly of a salt of stearic acid, the remainder consisting of or containing a plastic such as that described in the specification of the above patent application Ser. No. 663,153.

For preparing the proposed coatings substances which improve the lubricating and sliding properties of the stearates, especially graphite and molybdenum disulphide, may be added thereto. The content of such substances which improve the sliding properties of the stearate may rise up to 50%. However, the stearate may constitute only a very small portion of the lubricating film say about 1% or more; for some purposes the lubricating film may contain a rather high percentage of stearate and in some cases the said lubricating film may entirely consist of a stearate.

Moreover, to improve the adhesion of the stearate-containing coating it is desirable for the coating to contain small quantities of Tylose.

The method of applying the coating to parts of clocks and watches depends upon the particular properties possessed by the substances used.

Application to the surface of rubbing parts may be for instance as follows: First a fine aqueous suspension is prepared by uniformly dispersing the stearate in the water as a finely divided powder preferably containing a small quantity of Tylose (methyl cellulose). The dispersion is conveniently made with the help of an agitator, the simultaneous or immediately subsequent application of ultrasonic vibration having proved to be an advantage. A suspension produced exclusively by ultrasonic vibration has also been found satisfactory. It is preferred also to add a wetting agent to obtain as fine a dispersion as possible. In this manner largely stable suspensions can be obtained.

Secondly, the stearate may then be combined in any desired proportions with a suspension of a plastic, for instance a suspension of a polyfluorocarboxylic resin in water.

The proportions by weight of the above mentioned substances to the water should preferably exceed 0.1%.

Finally, the parts to be lubricated are immersed in the suspension. After removal of surplus liquid the resultant coating is dried, conveniently in slightly warm air. It may then be baked or sintered preferably at a temperature of 320° C. and a pressure of 50 atm. The stearate concentration in the suspensions employed in this process of immersion may be, for instance, between 0.02% and 3% by weight. Molybdenum disulphide, say in quantities of 0.1% to 2% by weight, may be added to the suspension to improve the lubricating properties of the stearate coating.

Suspensions in organic liquids such as alcohols, ethers, methylene chloride, etc., instead of in water have been found satisfactory. The application of such suspensions to parts of clocks and watches may be performed in the same way as has been described in said earlier patent application Ser. No. 663,153.

The preferred stearate is zinc stearate, but aluminum stearate, barium stearate, lead stearate, ammonium stearate, and others may likewise be used.

The stearate-containing coatings produced according to the invention may take the form of coatings which cover the entire surface of the parts in question in the form of a continuous unbroken film. However, the application of the stearate-containing coating may be limited to the working surfaces only, that is to say to those parts of the surface which are subject to rubbing friction.

The invention will now be illustratively described with reference to an example.

Cleaned mainsprings of watches are immersed for preferably 1 to 15 minutes in an aqueous suspension containing approximately 0.5% by weight of zinc stearate which may also contain 0.1% by weight of molybdenum disulphide. The bath containing the springs is then exposed to conventional ultrasonic vibration. The springs are left in the bath for 30 minutes. When removed and freed of surplus liquid the springs are dried by gentle heat. The resultant film of stearate is less than 0.0005 mm. thick and adheres very tenaciously to the metal surface of the spring.

Similarly satisfactory results are achieved by immersing the springs into an approximately 0.5% aqueous suspension of zinc stearate containing polytetrafluoro-ethylene and then air-drying the same, preferably with gentle heat.

Good results are also obtained if the zinc stearate is replaced by a mixture of zinc and ammonium stearates.

Owing to the thinness of the film a spring thus treated occupies less space in the barrel than a spring lubricated in the conventional manner. The self-lubricating spring according to the invention expands smoothly and without jerks, because the convolutions will not stick together even after prolonged service. Moreover, contrary to conventionally lubricated springs, the spring remains lubricated for the rest of its life and therefore does not require attention. The application of grease or oil when assembling the spring is unnecessary so that the cost of assembly can be reduced.

Comparative measurements showed that a mainspring provided with a stearate film delivered 5% to 10% more torque than a similar spring lubricated in the conventional manner, because frictional resistance between the coils was less. A mainspring prepared according to the invention may therefore be 5% thinner than similar springs as hitherto used. The saving in space in the barrel at the same time permits the length of the spring to be increased. When subjected to a durability test a spring prepared according to the invention proved to have the same torque output after 16,000 re-windings as when it was new.

We claim:
1. A self-lubricating component for clocks and watches, having at least its frictional wearing surface coated with a thin, firmly adherent, non-tacky film of an oil free lubricating substance consisting essentially of a stearate and an adhesion-promoting substance.

2. The method of manufacturing a self-lubricating component for clocks and watches consisting essentially of the steps of providing at least parts of the surfaces of such component which is subject to sliding contact, with a firmly adherent, non-tacky film consisting of from 0.02% to 3% of a salt of stearic acid and an adhesion promoting substance and having a thickness of less than one micron.

3. The method of manufacturing a self-lubricating component for clocks and watches consisting essentially of preparing a bath consisting of a suspension having from 0.02% to 3% of a stearate, adding a synthetic resin selected from the group consisting of thermoplastic and thermo-setting resins which is insoluble in the liquid phase, subjecting the bath to ultrasonic vibrations, immersing the component in said bath for up to 45 minutes to produce a film on said component not exceeding one micron in thickness and drying the coated component.

4. The method of manufacturing a self-lubricating component for clocks and watches consisting essentially of preparing a bath containing an aqueous suspension having from 0.02% to 3% of finely divided stearate, continuously agitating the bath while adding a water-insoluble synthetic resin selected from the group consisting of thermoplastic and thermosetting resins, the proportion by weight of the total disperse phase to the liquid phase exceeding 0.1%, immersing the component in the bath for up to 45 minutes to form a finished coating thickness not exceeding one micron, removing and drying the coated component and baking said component under pressure of up to 50 atmospheres.

5. The method of manufacturing a self-lubricating component for clocks and watches consisting essentially of preparing a bath containing a stable suspension having from 0.02% to 3% of zinc stearate and methyl cellulose, continuously agitating the bath whilst adding a water-insoluble synthetic resin selected from the group consisting of thermoplastic and thermosetting resins, the proportion by weight of the total disperse phase to the liquid phase exceeding 0.1%, immersing the component in the bath for up to 45 minutes to ensure a finished coating thickness not exceeding one micron, removing and drying the coated component and baking said component under pressure of up to 50 atmospheres.

6. A self-lubricating component as claimed in claim 1 in which said adhesion promoting substance is a synthetic substance selected from the group consisting of thermoplastic and thermosetting resins.

References Cited in the file of this patent
UNITED STATES PATENTS

| | | |
|---|---|---|
| 519,968 | Quinby | May 15, 1894 |
| 596,942 | McGowan | Jan. 4, 1898 |
| 2,657,668 | Maier | Nov. 3, 1953 |
| 2,673,818 | Woog | Mar. 30, 1954 |
| 2,767,239 | Kennedy | Oct. 16, 1956 |
| 2,798,005 | Love | July 2, 1957 |
| 2,932,503 | Le Van | Apr. 12, 1960 |